US008665485B2

(12) United States Patent
Mantell

(10) Patent No.: US 8,665,485 B2
(45) Date of Patent: Mar. 4, 2014

(54) SWAPPING RESOLUTION FACTORS FOR DIRECT MARKING PRINTING

(75) Inventor: David Allen Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2784 days.

(21) Appl. No.: 11/248,963

(22) Filed: Oct. 11, 2005

(65) Prior Publication Data

US 2007/0081172 A1    Apr. 12, 2007

(51) Int. Cl.
    *G06K 15/10*    (2006.01)
(52) U.S. Cl.
    USPC ............. 358/1.8; 358/1.2; 358/1.1; 358/1.15; 358/3.03; 347/41; 347/40; 347/42; 347/43; 347/9; 347/12; 347/13; 347/15
(58) Field of Classification Search
    None
    See application file for complete search history.

(56) References Cited

U.S. PATENT DOCUMENTS

| 4,978,971 | A | * | 12/1990 | Goetz et al. | 347/5 |
| 5,166,709 | A | * | 11/1992 | Kubelik | 347/120 |
| 5,625,389 | A | * | 4/1997 | Eriksen et al. | 347/41 |
| 6,068,361 | A | * | 5/2000 | Mantell | 347/15 |

FOREIGN PATENT DOCUMENTS

JP          09-135351      *  5/1997

* cited by examiner

*Primary Examiner* — Paul F Payer
(74) *Attorney, Agent, or Firm* — Marger Johnson & McCollom PC

(57) ABSTRACT

A method for printing including preparing an image at a first resolution in a first direction, selecting pixels from the prepared image, reordering the selected pixels to create a translated image having a second resolution in the first direction, where the second resolution is different from the first resolution, and printing the translated image. Also included are a printing system and an article of computer readable code.

20 Claims, 4 Drawing Sheets

SWAPPING RESOLUTION FACTORS FOR DIRECT MARKING PRINTING

BACKGROUND

1. Technical Field

The present disclosure relates to printing of images based on digital data.

2. Description of Related Art

Direct marking printing involves depositing a marking material, such as ink, onto a printing medium, such as paper, to form images on the printing medium. Common forms of direct marking printing include ink jet technologies.

In direct marking printing, increasing the resolution in the cross-process direction may be more costly than increasing the resolution in the process direction. For ink jet printers, the resolution in the cross-process direction is dependent on the spacing of adjacent jets of the same color. Increasing the resolution in the cross-process direction may involve increasing the number of jets, decreasing the jet spacing, or interlacing the jets. Increasing the number of parts or decreasing mechanical tolerances results in increased cost and decreased reliability that limit the commercially practical cross-process resolution. As a result, the image quality of a printed document may be inadequate.

SUMMARY

One embodiment is a printing system including a raster image processor to prepare an image, a translator to reorder dots of the image, and a print head to print the image.

Another embodiment is a method of printing including preparing an image, selecting pixels from the image, reordering the pixels to create a translated image that has a different resolution, and printing the translated image.

A further embodiment is an article of computer readable code to cause a computer to prepare an image, to translate the image, changing the resolution, and to print the translated image.

DETAILED DESCRIPTION

The following discussion uses terms such as "cross-process" and "process" to describe directions and resolutions. For a printed image, the process direction is defined as either the direction of movement of the printing medium relative to the print head, or the direction of movement of the print head relative to the printing medium. For example, for some ink jet printers, a print head extends along the length of a drum and ink is transferred on to the drum by the print head. The ink is transferred on to the printing medium as it rolls by the drum. The process direction is the direction perpendicular to the length of the print head, in the direction of travel of the printing medium. In contrast, in a consumer ink jet printer, where the print head travels back and forth across the printing medium, and the printing medium moves by a distance equal to the width of the print head or a fraction thereof in a direction perpendicular to the direction of travel of the print head, the process direction is the direction of travel of the print head across the printing medium. The cross-process direction is defined as the direction perpendicular to the process direction.

When discussing resolutions, a process resolution is a resolution in a process direction. Similarly, a cross-process resolution is a resolution in a cross-process direction.

The term "dot" is used to describe an element of an image that is marked during printing. A dot may refer to both the smallest amount of ink a printer may deposit on a printing medium as it exists on the printing medium or the representation of that ink in an earlier stage of processing.

The term "pixel" as used in this discussion refers to the smallest element of an image. A pixel may or may not contain a dot or multiple dots corresponding to an element of an image.

A printing system as used herein is any system capable of transferring an image to a printing medium through a direct marking printing process. The phrase printing system or printer as used herein encompasses any apparatus, such as an ink jet printer, a digital copier, a bookmaking machine, a facsimile machine, a multi-function machine, etc. which performs a print outputting function for any purpose. A printing system or printer is not limited to these examples. Although a monochrome printing system may be described herein, the claims may encompass embodiments that print in color or handle color image data.

Figure 1:
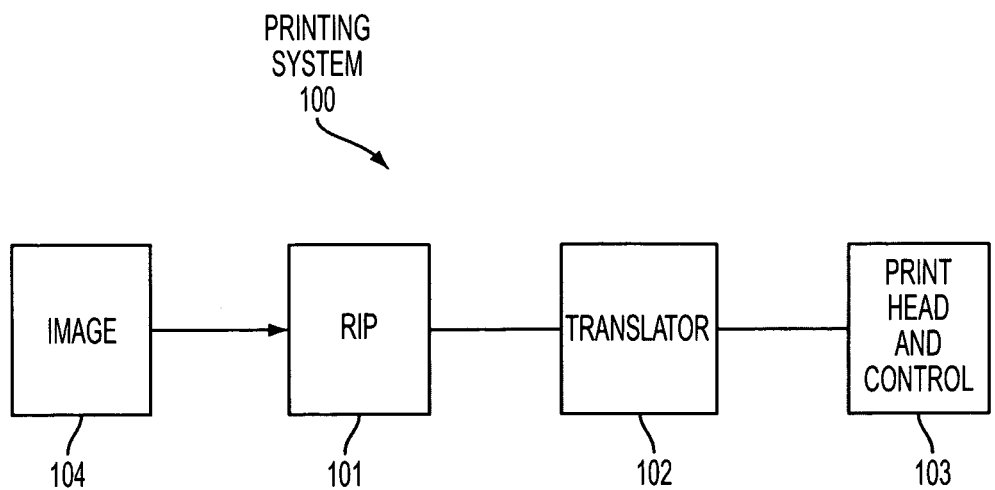
FIG. 1 is a block diagram of a printing system capable of swapping resolution factors.

FIG. 1 is a block diagram of a printing system capable of swapping resolution factors. The printing system 100 includes a raster image processor (RIP) 101, a translator 102, and a print head and control 103. The RIP 101 prepares the image to be printed 104 at a prepared resolution. The prepared resolution describes the number of pixels per inch in a process direction and a cross-process direction on the prepared image. The prepared resolution is commonly represented as A×B, meaning A pixels per inch (dpi) in one direction on the image and B dpi in a perpendicular direction. For example, a prepared resolution may be 600×450 dpi with 600 dpi in the cross-process direction and 450 dpi in the process direction.

Although in this example, A of the resolution A×B represented the cross-process resolution, one of ordinary skill in the art will appreciate that A or B may be the cross-process resolution, depending on the industry convention and the particular printing system. Furthermore, it is understood by one of ordinary skill in the art that the cross-process direction of an image is determined by the relationship of the image as printed and the cross-process direction of the printer.

The translator 102 reorders the pixels of the prepared image, creating a translated image at a translated resolution. Reordering is the process by which a pixel is moved to or copied into an image. A reordered pixel does not have to keep the same relationship that the pixel had with other pixels of the image before reordering. For example, two adjacent pixels, adjacent in a cross-process direction may be reordered to two pixels of the reordered image, adjacent in a process direction. In addition, a reordered pixel may occupy a pixel of the reordered image that did not exist in the prepared image or any intervening image before reordering. This is a result of the change in resolutions between the prepared image and the reordered image that occurs as a result of reordering.

Similar to the prepared resolution, the translated resolution describes the pixels per inch of the translated image. The prepared resolution and the translated resolution may be different from each other. For example, comparing the cross-process resolutions of the prepared and translated images, the prepared cross-process resolution may be greater than the translated cross-process resolution. The prepared process resolution may be lower than the translated process resolution. Thus, resolution lost in one direction, in this case the cross-process direction, lost while reordering the prepared image to the translated image, may be swapped for resolution gained in the other direction, in this case the process direction.

In addition, reordering may include creating a multi-level translated image. The multi-level image may have multiple dots per pixel. Pixels of the prepared image may be reordered to a level of a pixel in the multi-level translated image. As used in this discussion, an image that is reordered into a multi-level image is considered having a resolution different from a resolution of the multi-level image.

The translated image is then printed by the print head and control 103. The translated cross-process resolution may be chosen to be substantially equal to a print head or marking element cross-process resolution or some multiple thereof.

Although FIG. 1 describes a printing system, it is a simplified example. Only components necessary to describe the embodiment are shown and one of ordinary skill in the art will understand that a printing system may include other components not shown, including components located between the described components.

In other printing systems, the translated image may have a substantially similar number of pixels as the prepared image. For example, with a prepared resolution of 600×450 dpi, there will be 600 times 450 dots, or 270,000 possible dots in a square inch. If the translated image has a resolution of 300× 900 dpi, there will be 300 times 900, or 270,000 possible dots per square inch, the same as that of the prepared image.

A substantially similar number of pixels may result in a one to one mapping of pixels of the prepared image to pixels of the translated image. For example, starting again with a prepared resolution of 600×450 dpi, the pixels in two out of every three lines are reordered to reduce the cross-process resolution to 200, ⅓ of the original, and increase the process direction resolution to 1350, 3 times the original. Alternately, for some printing system images, pixels may contain multiple dots per pixel. As a result, the number of dots per pixel may be changed rather than or in addition to a change in the resolution. In many such cases the method of printing determines an effective resolution. For example if a multi-level pixel contains two dots that may be printed sequentially, the image resolution may appear to be substantially equivalent to an image with higher resolution in the cross-process direction.

More generally, during reordering of pixels, the number pixels of some ordered pattern of lines in the image is increased while the number of pixels in lines not within the ordered pattern is reduced, possibly to zero. This may be done as an evenly divided increase or decrease in resolution or in groups of pixels. For example, the pixels of the increased number of pixels from the example from the previous paragraph could be paired rather than evenly spaced at the higher resolution if the printing process used to generate the drops allowed. In addition the reordering could be done with lines extending in either the process or cross process direction. Thus, while matching the capabilities of the printing system, an image is prepared at a resolution that provides both optimum image quality and efficient processing.

As described above, the translator 102 may be located between the RIP 101 and the print head and control 103. Alternatively, the translator 102 may be located in various parts of the printer. For example, the translator 102 may be in the RIP 101. The RIP 101 would then prepare the image, reorder the prepared image to the translated image, and output the translated image. In addition, the translator 102 may be an application specific integrated circuit (ASIC) to perform the translation between the RIP 101 and the print head and control 103. The translator 102 may also be a part of the print head and control 103. One of ordinary skill in the art will appreciate that the translator 102 may be a part of any of the above named portions of a printer or other portions known by one of ordinary skill in the art to be located on the processing path of a printing system 100. Furthermore, the translator 102 may be implemented by a combination of components of a printing system 100. For example, the RIP 101 may identify the pixels to be reordered and the print head and control 103 may perform the reordering.

Figure 2:
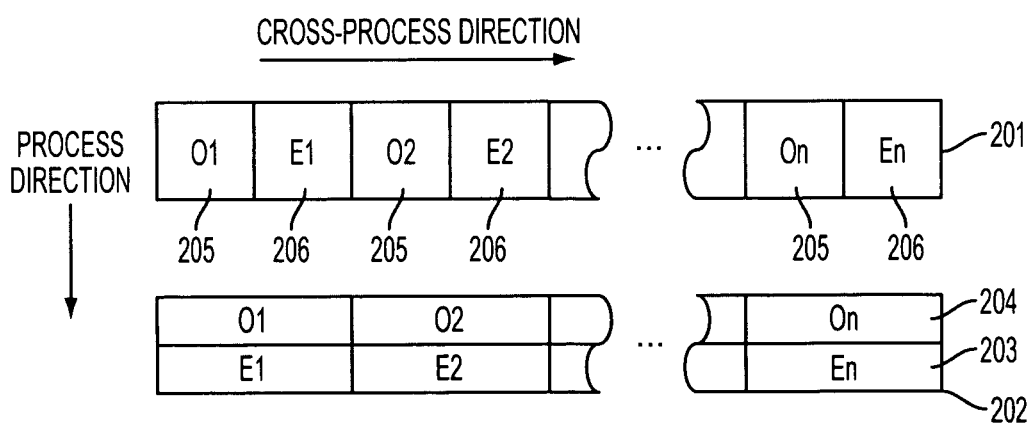
FIG. 2 is a diagram illustrating simultaneous reordering and printing.

In other alternatives, the translation may be performed at substantially the same time as the image is being printed. FIG. 2 is a diagram illustrating simultaneous reordering and printing. A prepared image has rows of pixels. One such row is a prepared image row 201. The prepared image row 201 has pixels O1–On in odd numbered columns 205 and pixels E1–En in even numbered columns 206. An even translated row 203 of the printed image 202 is made up of the pixels E1–En from the even columns 206 of the row of the prepared image 201 that is being translated. An odd translated row 204 of the printed image 202 is made up of the pixels O1–On from the odd columns 205 of the prepared image row 201 that is being translated. Hence, each row that is printed is made of either the even or odd columns, 206 or 205, of a corresponding prepared image row 201. The translator may instruct the print head and control 103 to print a translated row 203 or 204 at substantially the same time as the translator 102 extracts the translated row 203 or 204 from the columns 205 and 206, of a prepared image row 201.

Figure 3:
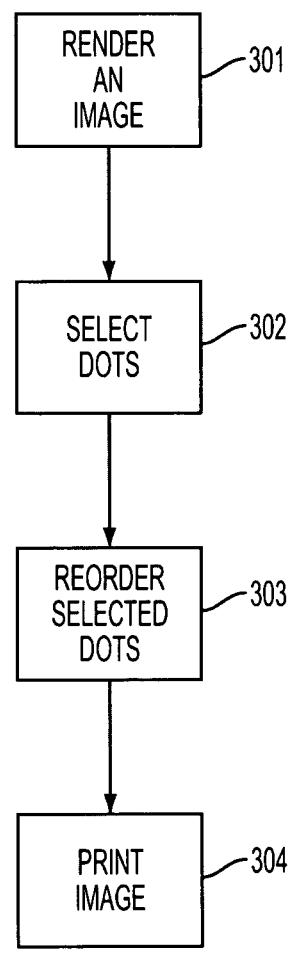
FIG. 3 is a flowchart illustrating a method of printing by swapping resolution factors.

FIGS. 3-6 illustrate methods of printing. FIG. 3 is a flowchart illustrating a method of printing by swapping resolution factors. An image is prepared at a first cross-process resolution at 301. At 302, pixels are selected from the prepared image. The selected pixels are reordered into a translated image having a second cross-process resolution at 303, where the second cross-process resolution is different from the first cross-process resolution. At 304, the translated image is printed.

Figure 4:
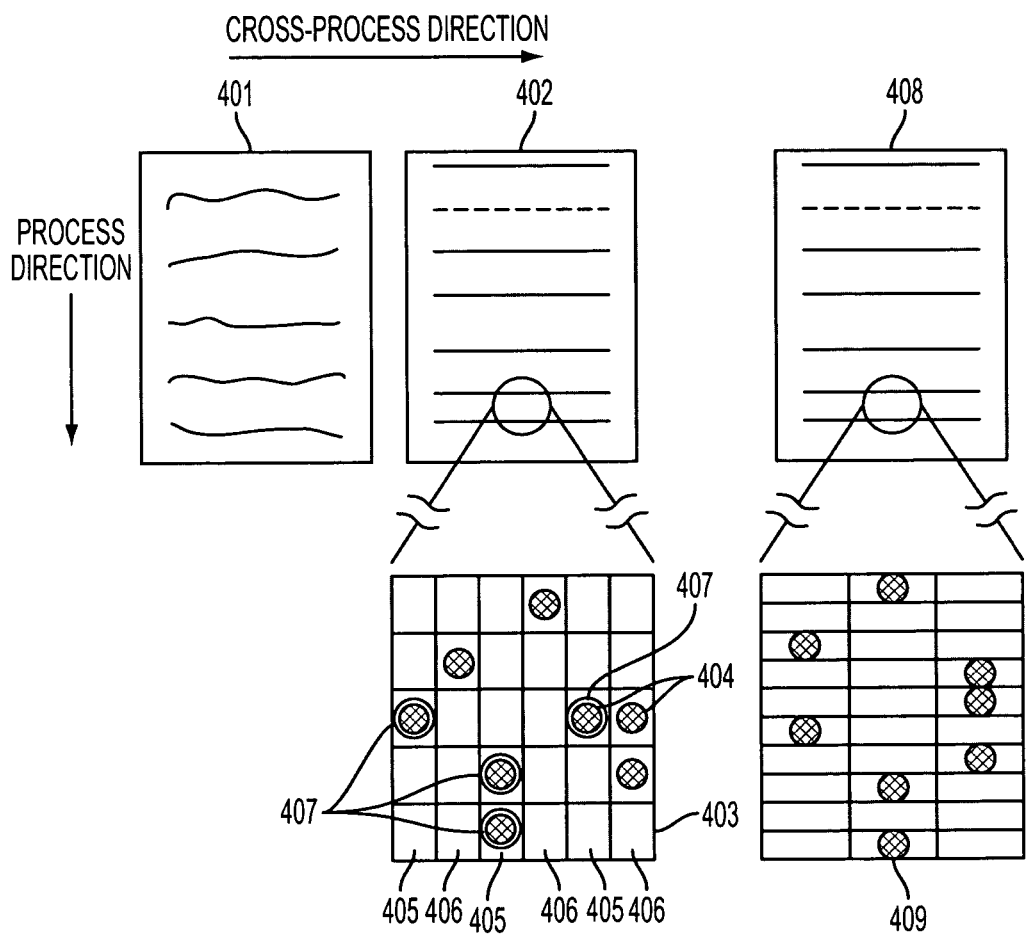
FIG. 4 is a diagram of an image, a prepared image, a translated image, and magnifications showing the dots of the prepared image and the translated image.

Referring to FIG. 4, in one method, an image to be printed 401 is prepared at a prepared resolution. Preparing creates a prepared image 402 from the image to be printed 401 by reducing the image to be printed 401 to a representation of dots 404. An expanded prepared view 403 shows dots 404 of the prepared image 402.

The prepared image 402 has a prepared resolution, representing the number of pixels per unit length, both in a process and a cross-process direction. The cross-process resolution is the resolution of the prepared image 402 in the direction that, when printed, is the direction in the cross-process direction for the printer.

A stated above, dots 404 form the prepared image 402. From the prepared image 402, pixels are selected; in this case, pixels containing selected dots 407 are selected. The pixels containing the selected dots 407 are then reordered, creating a translated image 408. One of ordinary skill in the art will understand that the translated image 408 and the prepared image 402 may occupy the same storage space, separate storage space, or a combination of the two. As used here, storage space is the embodiment of an image before it is printed. For example, the prepared image 402 may occupy memory in a computer memory. Reordering may operate solely on the memory occupied by the prepared image 402, reordering pixels from the prepared locations as needed. The prepared image memory then becomes the translated image memory. Alternatively, the translated image 408 may occupy separate memory, where reordering duplicates the pixels of the prepared image 402 as reordered in the translated image 408. In addition, the translated image 408 may occupy some memory that was part of the prepared image memory and some memory that was separate from the prepared image memory.

After reordering the pixels containing the selected dots 407 of the prepared image 402 into a translated image 408, the translated image 408 has a different resolution from the prepared image 402. Particularly, the cross-process resolution of the translated image 408 may be less than the cross-process resolution of the prepared image 402. For example, with a 600×450 dpi prepared resolution, the translated resolution may be 300×900 dpi. The cross-process resolution of the prepared image 402 is 600 dpi. The cross-process resolution of the translated image of 300×900 dpi is 300 dpi. The translated image is then printed.

In addition, the reordering may occur at any point in the processing path. For example, the reordering may occur during ripping, rendering, color conversion, halftoning, error diffusion, or printing. Furthermore, the reordering may occur within any combination of any process in the processing path. For example, a portion of the reordering may occur during ripping, with the remainder occurring during halftoning.

Figure 5:
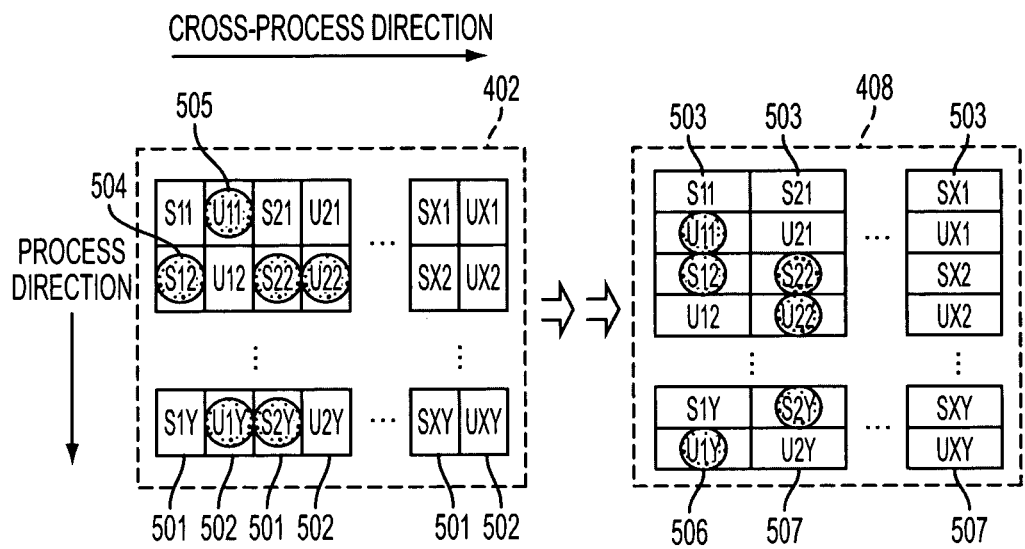
FIG. 5 is a diagram showing interleaving columns of a prepared image into columns of a translated image.

FIG. 5 illustrates a specific method of printing by interleaving columns of a prepared image 402 into a column of a translated image 408. The prepared image 402 has even columns 502 and odd columns 501 of pixels extending in the process direction. SXY and UXY represent pixels of the prepared image 402, the X and Y of UXY or SXY representing a number corresponding to the column and row of the pixel. Odd columns are selected, selecting pixels of the column, including those containing any dots 504 in pixels SXY. Even columns 502 are not selected, leaving pixels UXY, including pixels containing any dots 505 unselected.

The translated image 408 has columns 503. The pixels SXY are reordered with the pixels UXY of the translated image 408 as shown. Pixels S1Y and U1Y are reordered to the first column 506. The first column 506 of the translated image 403 has the pixels S1Y and U1Y interleaved with each other. The same interleaving is repeated with subsequent pairs of selected and unselected columns, interleaving them into the subsequent columns 507 of the translated image 408.

Any dots, such as selected dots 504 and unselected dots 505, follow their respective pixel. As a result, the dots 504 are reordered, interleaving the dots 504 with the dots 505 in the translated image 408. The translated image 408 is then printed. By reordering the pixels as described, two columns of pixels of the prepared image 402 become one column in the translated image 408. As a result, the cross-process resolution of the translated image 408 is less than that of the prepared image 402.

Although the above example describes a method of reordering through a specific interleaving pattern, other interleaving patterns are possible and may depend on the data of the image. For example, in the example shown in FIG. 4 each selected pixel may be reordered to an upper or lower position, relative to an unselected pixel, to change the probability of overlap of nearby dots. Such reordering may be performed regardless of the relative order of selected and unselected pixels in the translated image.

Although a method of selection, selecting odd columns, has been described, a person of ordinary skill in the art will understand that other selection methods are possible, such as selecting every third or fourth column. The selected columns are then interleaved with the unselected columns, decreasing the cross-process resolution. Furthermore, although one example of interleaving has been described, one of ordinary skill in the art will understand that other methods of interleaving may be used. For example, an interleaved column may begin with an unselected pixel occupying the first space in the column, instead of a selected pixel as described above, followed by alternating selected and unselected pixels.

In another method, the prepared resolution may be substantially equal in a cross-process and a process direction. As described above, because of the expense of increasing the cross-process resolution as compared to the process resolution, printer resolutions are often asymmetric. However, since a person viewing a printed image will not normally know which direction is the process direction, it is desirable to have a prepared resolution that is either substantially equal in a cross-process and process direction, or a prepared resolution where the cross-process and process resolutions are closer to being equal than the cross-process and process resolutions of the printer.

By printing at such a resolution, the printed image has a more uniform quality. However, an image prepared at such a resolution may not be able to be printed on a given printer, particularly if the cross-process resolution of the prepared image is greater than the cross-process resolution of the printer. Thus, the prepared image is reordered to match the asymmetrical resolution of the printer.

Had the image been prepared at the resolution of the printer, and not reordered before printing, artifacts of the lower resolution of the printer will appear. These artifacts may include jagged edges on straight lines or letters. Preparing at a resolution that is more symmetrical and reordering to the resolution of the printer reduces the effect of artifacts of printing at a lower resolution.

Figure 6:
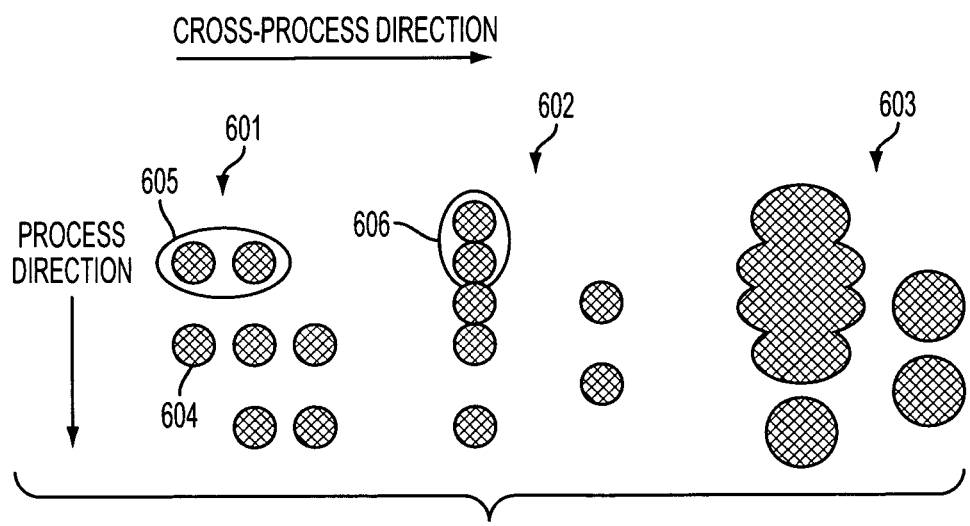
FIG. 6 is a diagram showing the spreading of ink in a cross-process direction.

FIG. 6 shows the spreading of ink in a cross-process direction. In general, the print head deposits ink on the printing medium corresponding to the dots of the translated image 408. During printing, the ink spreads in a cross-process direction. For example, in a printer that transfers ink on to a drum, then transfers the ink from the drum on to the printing medium though heat and pressure, the ink may spread because of the heat and pressure applied by the drum during the transfer. In aqueous ink printers, the ink may spread by flowing across the printing medium. In either example, the ink spreads in a cross-process direction.

Adjacent dots in the process direction will spread more in the cross-process direction than they would have spread if printed in isolation. Two dots that are printed near the same time and printed close enough together may combine on the page to form a single dot that will spread roughly the same as a dot of twice the amount of ink, greater than the spread of one dot alone. Thus, the spread in the cross-process direction is greater than if the dot was printed alone.

Adjacent dots in a process direction may occur because of the reordering process. FIG. 6 shows a close up of a prepared image 601, a close up of a translated image 602, and a close up of a printed image 603. The prepared image 601 has dots 604. Some of these dots are cross-process adjacent dots 605, adjacent the cross-process direction. In the translated image 602, some dots are process adjacent dots 606, adjacent in a process direction.

As described above, when every other column of pixels is selected and interleaved with the adjacent unselected column, two cross-process adjacent dots 605 of the prepared image 601 are reordered in the translated image 602 to two process adjacent dots 606. As shown in the close up of the printed image 603, these process adjacent dots 606 spread more in a cross-process direction, filling in space on the printed image approximately where the reordered dot would have been, that is, adjacent in the cross-process direction. Thus, the printed image quality approaches the prepared image quality having the higher cross-process resolution, while being printed at the lower cross-process resolution of the printer.

The methods discussed above may be implemented through computer readable code embodied on a computer readable medium. One example of the code causes the computer to prepare an image. Then, the prepared image is reordered to a translated image. The translated image has a cross-process resolution that is different from the cross-process resolution of the prepared image. The translated image is sent to a printer to be printed.

A computer, as used here, refers to any device that can read and implement computer readable code. For example, a microprocessor, a raster image processor, a microcontroller, a symmetric multiprocessor cluster, etc. would be considered computers, as would any printer or printing system containing such a device or capable of reading computer readable code.

A particular example of the computer readable code is code that is contained within the printer driver for the printer. Another example is code contained within a raster image processor.

As used in this discussion, preparing includes raster image processing, scaling, or otherwise manipulating an image to create a representation of that image in pixels. As a result, the pixels of a prepared image contain data representing the image before preparing. Sometimes images are captured or already stored in a pixelized form. To process them it is often necessary to scale them to the appropriate size and resolution as desired for subsequent processing steps such as rendering. As used in this discussion, preparing an image may include such a process in addition to or in place of ripping of an image as described above.

Rendering, as used in this discussion, converts an image of pixels to a binary or multi-level printable image. The pixels of the prepared image have data representing the ink or marking medium to be transferred to the printing medium.

Prior to rendering, the image may be linearized in the color space of the printer if it is not already prepared as such. This process of color conversion is well known in the art. Some printers use only one color, black, while typical color printers may use 4 colorants, cyan, magenta, yellow, and black. Color conversion converts an image to a representation of the colorants on the printing medium.

Although terms such as cross-process and process have been used to describe terms such as directions and resolutions in reference to swapping of resolution factors in one direction for another, one of ordinary skill in the art will appreciate that such swapping is not limited to swapping decreases in a cross-process resolution in exchange for increases in a process resolution. Such swapping may occur between resolutions regardless of the name or categorization of the resolutions. For example, decreases in a process resolution may be swapped for increases in a cross-process resolution.

Although in the above discussion of reordering, some examples may have been described as preserving every pixel, one of ordinary skill in the art will appreciate that pixels may be discarded during reordering. For example, an image may be prepared at a resolution having a greater number of pixels per unit area than the desired translated image. During reordering some pixels may be discarded while others are reordered in the translated image to approximate the higher resolution of the prepared image.

Although the above discussion may apply to single pass direct marking printers, one of ordinary skill in the art will appreciate that embodiments may extend to multi-pass direct marking printers, printers with multiple marking heads, or any other direct marking printer.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of printing an image based on digital data, comprising:
   preparing an image having a first resolution in a first direction;
   selecting a plurality of pixels of the prepared image, leaving a plurality of unselected pixels;
   reordering the selected pixels and the unselected pixels into a translated image having a second resolution in the first direction, the second resolution different from the first resolution; and
   printing the translated image.

2. The method of claim 1, wherein the selecting and the reordering occur during at least one of a period during preparing, and a period after preparing.

3. The method of claim 1, further comprising:
   rendering the image, wherein the selecting and the reordering occur during a period before rendering.

4. The method of claim 1, further comprising:
   performing at least one of color conversion, halftoning, and error diffusion on the image, and the selecting and the reordering occuring during the performance of the at least one of the color conversion, the halftoning, and the error diffusion on the image.

5. The method of claim 1, wherein selecting a plurality of pixels from the image further comprises selecting at least one column of pixels to select the pixels of the at least one column of pixels, leaving at least one unselected column of pixels.

6. The method of claim 5, reordering the selected pixels and the unselected pixels further comprising interleaving the pixels of selected columns with a plurality of pixels of the at least one unselected columns of pixels.

7. The method of claim 5, selecting at least one column of pixels further comprising selecting every other column.

8. The method of claim 7, reordering the selected pixels and unselected pixels further comprising interleaving pixels from a selected column with pixels from an adjacent unselected column.

9. The method of claim 1, preparing an image at a first resolution further comprising preparing the image with a third resolution in a second direction, the second direction substantially orthogonal to the first direction, such that a ratio of the first resolution to the third resolution is closer to unity than a ratio of a first print head resolution in the first direction to a second print head resolution in the second direction.

10. The method of claim 1, wherein reordering the selected pixels and the unselected pixels further comprises storing the translated image in a first storage space separate from a second storage space for the prepared image prior to printing the translated image.

11. The method of claim 1, reordering the selected pixels and the unselected pixels further comprising reordering a selected pixel that is adjacent to an unselected pixel in the first direction in the prepared image to a reordered pixel in the translated image that is adjacent to the unselected pixel in a second direction, the second direction substantially orthogonal to the first direction.

12. A printer comprising:
a processor to prepare an image to be printed, the image to be prepared at a first resolution in a first direction;
a translator to reorder pixels of the prepared image, creating a translated image at a second resolution in the first direction, such that the second resolution is different from the first resolution; and
a print head to print the translated image, the print head having a third resolution in a first direction substantially equal to one of the second resolution and a multiple of the second resolution.

13. The printer of claim 12, wherein a total of the pixels of the prepared image is substantially equal to a total of the pixels of the translated image.

14. The printer of claim 12 wherein dots occupying any of the pixels of the translated image spread in the first direction when printed.

15. The printer of claim 12, the translator further comprising one selected from the group consisting of: a part of a raster image processor, an application specific integrated circuit (ASIC), a part of the print head, and a combination of the part of the raster image processor, the application specific integrated circuit, and the part of the print head.

16. The printer of claim 12, the translator further creating the translated image at substantially the same time as the print head is printing the translated image.

17. The printer of claim 12, the print head further comprising part of a direct marking printer.

18. A non-transitory computer readable medium embodying computer readable code that, when executed, causes the computer to:
prepare an image having a first resolution in a first direction;
reorder the pixels of the prepared image into a translated image such that the translated image has a second resolution in the first direction, where the second resolution is lower than the first resolution; and
transmit the translated image to a printer to be printed.

19. The non-transitory computer readable medium of claim 18, wherein the code is contained within a printer driver for the printer.

20. The non-transitory computer readable medium of claim 18, wherein the code is contained in a raster image processor.

* * * * *